(12) United States Patent
Jin et al.

(10) Patent No.: US 11,281,541 B2
(45) Date of Patent: Mar. 22, 2022

(54) DYNAMIC SNAPSHOT BACKUP IN MULTI-CLOUD ENVIRONMENT

(71) Applicant: EMC IP Holding Company LLC, Hopkinton, MA (US)

(72) Inventors: Qi Jin, Sudbury, MA (US); Xuan Tang, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 122 days.

(21) Appl. No.: 16/743,161

(22) Filed: Jan. 15, 2020

(65) Prior Publication Data
US 2021/0216410 A1    Jul. 15, 2021

(51) Int. Cl.
G06F 12/00     (2006.01)
G06F 11/14     (2006.01)
G06F 3/06      (2006.01)

(52) U.S. Cl.
CPC .......... *G06F 11/1461* (2013.01); *G06F 3/061* (2013.01); *G06F 3/067* (2013.01); *G06F 11/1448* (2013.01); *G06F 3/065* (2013.01)

(58) Field of Classification Search
CPC .. G06F 11/1461; G06F 11/1448; G06F 3/061; G06F 3/067; G06F 3/065
See application file for complete search history.

(56) References Cited

U.S. PATENT DOCUMENTS

| | | | |
|---|---|---|---|
| 7,099,957 B2 | 8/2006 | Cheline et al. | |
| 7,213,124 B2 | 5/2007 | Serizawa et al. | |
| 7,383,463 B2 | 6/2008 | Hayden et al. | |
| 7,457,982 B2 | 11/2008 | Rajan | |
| 7,562,216 B2 | 7/2009 | Borthakur et al. | |
| 7,631,155 B1 | 12/2009 | Bono et al. | |
| 7,721,057 B2 | 5/2010 | Berkowitz et al. | |
| 7,739,312 B2 | 6/2010 | Gordon et al. | |
| 7,769,722 B1 | 8/2010 | Bergant et al. | |
| 7,873,700 B2 | 1/2011 | Pawlowski et al. | |
| 8,301,798 B2 | 10/2012 | Mond et al. | |
| 8,312,231 B1 | 11/2012 | Li et al. | |
| 8,554,808 B2 | 10/2013 | Fukatani et al. | |
| 8,892,631 B2 | 11/2014 | Brown et al. | |
| 8,996,837 B1 | 3/2015 | Bono et al. | |
| 9,280,555 B1 | 3/2016 | Bono et al. | |
| 9,304,999 B1 | 4/2016 | Bono et al. | |
| 9,305,009 B1 | 4/2016 | Bono et al. | |

(Continued)

OTHER PUBLICATIONS

Bono, Jean-Pierre, et al.; "Replicating File Systems Via Cloud Storage," U.S. Appl. No. 16/263,031, filed Jan. 31, 2019.

(Continued)

*Primary Examiner* — Shawn X Gu
(74) *Attorney, Agent, or Firm* — BainwoodHuang

(57) ABSTRACT

A technique for backing up snapshots in a multi-cloud environment includes accessing multiple cloud storage providers and obtaining therefrom respective sets of storage performance data. The technique further includes receiving storage requirements for snapshots of a data object and selecting, based on the requirements and the storage performance data, a designated cloud storage provider for receiving archived snapshots of the data object. The technique then transmits one or more snapshots of the data object to the designated cloud storage provider for archiving.

22 Claims, 5 Drawing Sheets

(56) References Cited

U.S. PATENT DOCUMENTS

| | | | |
|---|---|---|---|
| 9,305,071 | B1 | 4/2016 | Bono et al. |
| 9,378,219 | B1 | 6/2016 | Bono et al. |
| 9,389,932 | B2 | 7/2016 | Fang |
| 9,424,117 | B1 | 8/2016 | Bono et al. |
| 9,497,103 | B2 | 11/2016 | Williams et al. |
| 9,507,787 | B1 | 11/2016 | Bono et al. |
| 9,535,630 | B1 | 1/2017 | Bono et al. |
| 9,635,132 | B1 | 4/2017 | Lin et al. |
| 10,019,180 | B1 | 7/2018 | Aoyagi et al. |
| 10,447,524 | B1 | 10/2019 | Bono et al. |
| 2010/0174811 | A1 | 7/2010 | Musiri et al. |
| 2010/0199042 | A1 | 8/2010 | Bates et al. |
| 2010/0241731 | A1 | 9/2010 | Du et al. |
| 2010/0332401 | A1* | 12/2010 | Prahlad ............... H04L 63/0428 705/80 |
| 2012/0016838 | A1 | 1/2012 | Arai et al. |
| 2013/0007219 | A1 | 1/2013 | Sorenson, III et al. |
| 2014/0006354 | A1 | 1/2014 | Parkison et al. |
| 2014/0108351 | A1 | 4/2014 | Nallathambi et al. |
| 2014/0181441 | A1 | 6/2014 | Kottomtharayil et al. |
| 2014/0201150 | A1 | 7/2014 | Kumarasamy et al. |
| 2015/0269213 | A1 | 9/2015 | Avati |
| 2016/0179826 | A1 | 6/2016 | Batra |
| 2016/0212198 | A1 | 7/2016 | Krishnasamy et al. |
| 2017/0185605 | A1 | 6/2017 | Higuchi et al. |
| 2017/0262350 | A1 | 9/2017 | Dornemann |
| 2017/0344618 | A1 | 11/2017 | Horowitz et al. |
| 2018/0060062 | A1 | 3/2018 | Sampson |
| 2018/0196831 | A1* | 7/2018 | Maybee ................. G06F 3/061 |
| 2019/0108231 | A1 | 4/2019 | Patterson |
| 2019/0213123 | A1* | 7/2019 | Agarwal ............... G06F 16/188 |
| 2019/0213265 | A1 | 7/2019 | Boerner et al. |
| 2019/0235968 | A1 | 8/2019 | Bono |
| 2019/0235972 | A1 | 8/2019 | Bono |
| 2019/0238618 | A1 | 8/2019 | Bono et al. |
| 2020/0287804 | A1* | 9/2020 | Dalela ................. H04L 43/067 |

OTHER PUBLICATIONS

"Configuring NFS on VNX™," EMC® VNX™ Series, Release 7.1, EMC Corporation, 1998, 150 pages.

Dell EMC Unity: Cloud Tiering Appliance (CTA) A Detailed Review; Nov. 2017; 29 pages.

EMC VNX Replication Technologies; Nov. 2015; 34 pages.

EMC VNX Snapshots; Dec. 2013; 57 pages.

EMC® Cloud Tiering Appliance and Cloud Tiering Appliance/VE; Version 12.0 Getting Started Guide; Jul. 2017; 141 pages.

EMC® VNX™ Series Release 7.0 Configuring Virtual Data Movers on VNX™; Feb. 2011; 80 Pages.

Herbert Potzl, Marc E. Fluczynski; "Linux-VServer"; "Proceedings of the Linux Symposium" vol. Two; Jun. 27-30, 2007; pp. 151-160.

Using EMC®Celerra Replicator™ (V2); Feb. 2009; 184 pages.

VMAX3 and VMAX All Flash With Cloudarray Hypermax OS Integration with CloudArray; Sep. 2016; 11 pages.

BMC Multi-Cloud Management Solutions; downloaded from http://documents.bmc.com/products/documents/66/11/496611/496611.pdf; Copyright 2017 BMC Software, Inc.

Net App; Multicloud Portfolio for a Multicloud Strategy; downloaded from https://blog.netapp.com/multicloud-portfolio-for-a-multicloud-strategy/; Jul. 11, 2018.

Dell EMC Cloudarray: Cloud-Intergrated Storage; 3 pages; Copyright 2016 EMC Corporation.

* cited by examiner

DYNAMIC SNAPSHOT BACKUP IN MULTI-CLOUD ENVIRONMENT

BACKGROUND

Data storage systems are arrangements of hardware and software in which storage nodes are coupled to arrays of non-volatile storage devices, such as magnetic disk drives, electronic flash drives, and/or optical drives. The storage nodes service storage requests, arriving from host machines ("hosts"), which specify blocks, files, and/or other data elements to be written, read, created, deleted, and so forth. Software running on the storage nodes manages incoming storage requests and performs various data processing tasks to organize and secure the data elements on the non-volatile storage devices.

Many data storage systems support snapshot technology, i.e., the ability to generate point-in-time versions of production data objects, such as file systems, LUNs (Logical UNits), and virtual machine disks, for example. Some customers employ snapshot policies, which specify snapshots to be generated at a defined frequency and retained for a defined interval, ensuring that earlier versions of production data objects can be restored if needed. Restoring old versions may be necessary to get behind data corruption or malware attacks. Further, accessing old versions may be helpful for historical or forensic reasons.

SUMMARY

Retaining snapshots can consume considerable storage space. To avoid overly taxing production storage systems, administrators often seek alternative arrangements for snapshot archiving. Recently, administrators have looked to cloud storage solutions to meet their needs.

Unfortunately, administrators can have difficulty identifying the best cloud storage solutions to meet the requirements of their snapshot policies. Many cloud storage providers are available, and their numbers continue to grow. Different storage providers have different offerings, and those offerings can vary in crucial ways, such as in terms of reliability, cost, and/or security. The complexity of selecting an appropriate cloud storage solution has thus grown into a task that administrators can find difficult to manage.

In contrast with prior approaches, which can be burdensome to administrators, an improved technique accesses multiple cloud storage providers and obtains therefrom respective sets of storage performance data. The technique receives storage requirements for snapshots of a data object, e.g., from an administrator, and selects, based on the requirements and the storage performance data, a designated cloud storage provider for receiving archived snapshots of the data object. The technique then transmits one or more snapshots of the data object to the designated cloud storage provider for backup.

Certain embodiments are directed to a method of backing up snapshots in a multi-cloud environment. The method includes receiving storage requirements for snapshots of a data object and accessing multiple cloud storage providers to obtain respective sets of storage performance data. The method further includes selecting, based on the storage requirements and on the storage performance data, a designated cloud storage provider from among the multiple cloud storage providers, and transmitting a snapshot of the data object to the designated cloud storage provider for storage thereby.

Other embodiments are directed to a computerized apparatus constructed and arranged to perform a method of backing up snapshots in a multi-cloud environment, such as the method described above. Still other embodiments are directed to a computer program product. The computer program product stores instructions which, when executed on control circuitry of a computerized apparatus, cause the computerized apparatus to perform a method of backing up snapshots in a multi-cloud environment, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION

Embodiments of the improved technique will now be described. One should appreciate that such embodiments are provided by way of example to illustrate certain features and principles but are not intended to be limiting.

An improved technique of backing up snapshots in a multi-cloud environment accesses multiple cloud storage providers and obtains therefrom respective sets of storage performance data. The technique receives storage requirements for snapshots of a data object and selects, based on the requirements and the storage performance data, a designated cloud storage provider for receiving archived snapshots of the data object. The technique then transmits one or more snapshots of the data object to the designated cloud storage provider for archiving.

Figure 1:
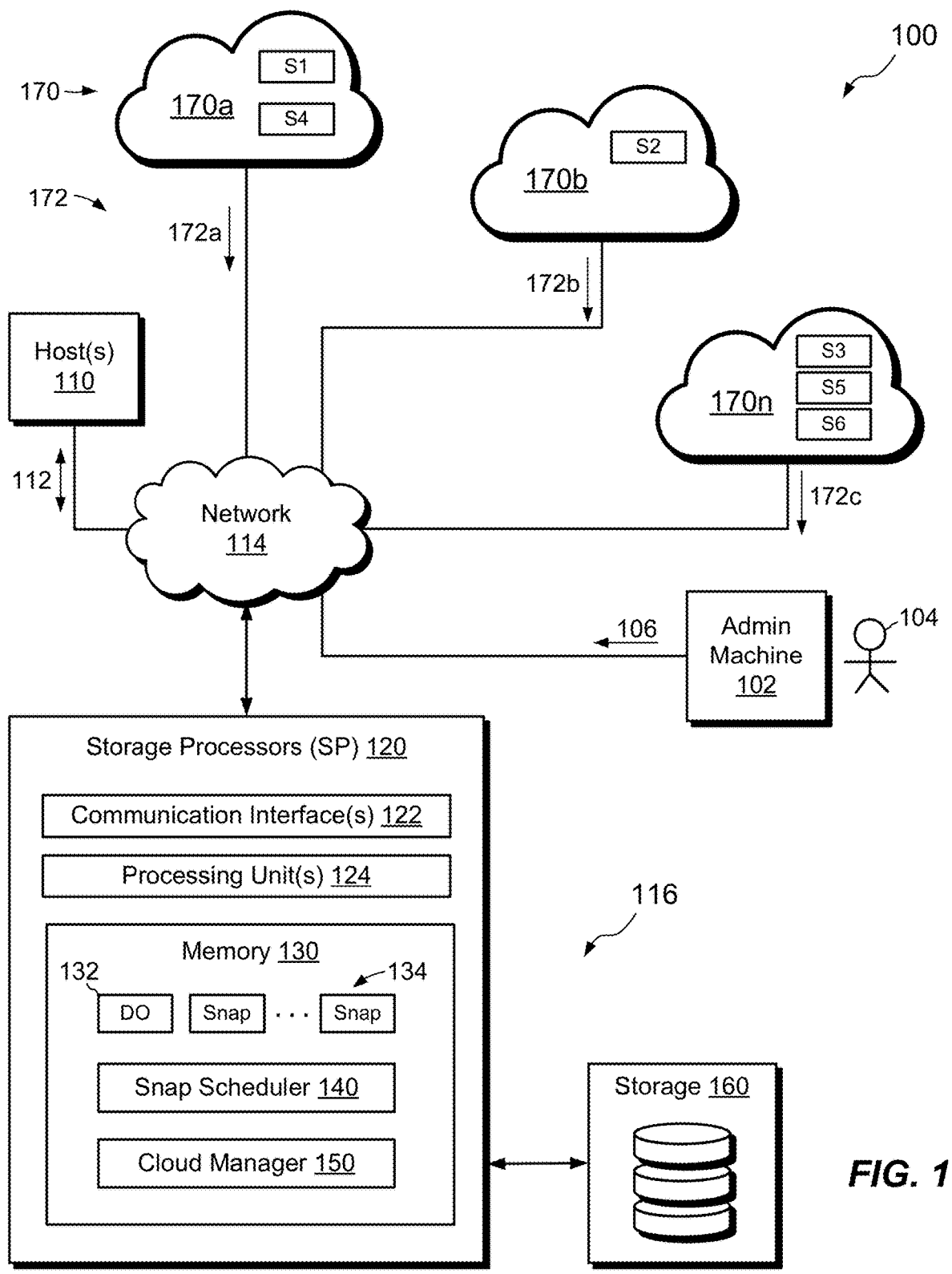
FIG. 1 is a block diagram of an example environment in which embodiments of the improved technique can be practiced.

FIG. 1 shows an example environment 100 in which embodiments of the improved technique can be practiced. Here, one or more hosts 110 are configured to access a data storage system 116 over a network 114. An administrator machine 102, operable by an administrator 104, is also configured to access the data storage system 116. The environment 100 further includes multiple cloud storage providers 170 (i.e., 170a-170n), which may include any number of private cloud storage providers and/or public cloud storage providers. Examples of private cloud storage providers include BMC Software, VMware, and Virtustream. Examples of public cloud storage providers include Amazon Web Services (AWS), Microsoft Azure, and Apple iCloud. These are just of few of the many available offerings. Embodiments are not limited to any particular provider or technology, however.

The data storage system 116 includes a storage processor, or "SP," 120 and persistent storage 160, such as magnetic disk drives, electronic flash drives, and/or the like. The data storage system 116 may include multiple SPs, which may also be referred to herein as "storage nodes." For example, multiple SPs may be provided as circuit board assemblies or blades, which plug into a chassis that encloses and cools the SPs. The chassis has a backplane for interconnecting the SPs, and additional connections may be made among SPs using cables. In some examples, the SP 120 is part of a storage cluster, such as one which contains any number of storage appliances, where each appliance includes a pair of SPs connected to shared storage devices. In some arrangements, a host application runs directly on the SP (or SPs), such that separate host machines 110 need not be present. No particular hardware configuration is required, however, as any number of SPs may be provided, including a single SP, in any arrangement, and the SP 120 can be any type of computing device capable of running software and processing host I/O's.

The network 114 may be any type of network or combination of networks, such as a storage area network (SAN), a local area network (LAN), a wide area network (WAN), the Internet, and/or some other type of network or combination of networks, for example. In cases where hosts 110 are provided, such hosts 110 may connect to the SP 120 using various technologies, such as Fibre Channel, iSCSI (Internet small computer system interface), NFS (network file system), and CIFS (common Internet file system), for example. As is known, Fibre Channel and iSCSI are block-based protocols, whereas NFS and CIFS are file-based protocols. The SP 120 is configured to receive I/O requests 112 according to block-based and/or file-based protocols and to respond to such I/O requests 112 by reading or writing the storage 160.

The SP 120 includes one or more communication interfaces 122, a set of processing units 124, and memory 130. The communication interfaces 122 include, for example, SCSI target adapters and/or network interface adapters for converting electronic and/or optical signals received over the network 114 to electronic form for use by the SP 120. The set of processing units 124 includes one or more processing chips and/or assemblies, such as numerous multi-core CPUs (central processing units). The memory 130 includes both volatile memory, e.g., RAM (Random Access Memory), and non-volatile memory, such as one or more ROMs (Read-Only Memories), disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 is made to carry out the operations of the software constructs. Although certain software constructs are specifically shown and described, it is understood that the memory 130 typically includes many other software components, which are not shown, such as an operating system, various applications, processes, and daemons.

As further shown in FIG. 1, the memory 130 "includes," i.e., realizes by execution of software instructions, a snapshot scheduler 140 and a cloud manager 150. The snapshot scheduler 140 is configured to direct SP 120 to generate snapshots 134 of production data objects, such as data object ("DO") 132, on a determined snapshot schedule. The cloud manager 150 is configured to access multiple cloud providers 170 (i.e., 170a-170n) and to obtain storage performance data 172 therefrom. The cloud manager 150 is further configured to select a designated cloud storage provider 170s and to transmit snapshots 134 of the data object 132 to the designated cloud storage provider 170s on a determined backup schedule. Although the description herein focuses on a single data object 132 and its snapshots 134, one should appreciate that the same or similar functionality applies to any number of data objects and their snapshots.

In example operation, host(s) 110 issue I/O requests 112 to the data storage system 116. SP 120 receives the I/O requests 112 at the communication interfaces 122 and initiates further processing. For example, SP 120 executes write operations on data object 132. As data object 132 evolves over time in response to the write operations, snap scheduler 140 directs SP 120 to generate snapshots 134 of data object 132 at respective points in time. For example, snap scheduler 140 may specify that a new snapshot 134 be taken once per day, once per hour, or once per minute, depending for example on write intensity to data object 132 and on the criticality of its data. In some examples, snapshot frequency is based on a service level agreement (SLA) in effect with a customer that owns or controls the data object 132.

Cloud manager 150 orchestrates backups of snapshots 134, e.g., by storing the snapshots 134 at locations other than on the data storage system 116, which may be resource constrained and unable to store snapshot backups efficiently. In an example, cloud manager 150 contacts cloud storage providers 170 to obtain storage performance data 172 therefrom. For example, each cloud storage provider 170 may furnish storage space at a certain level of reliability (e.g., three nines, five nines, etc.), at a certain cost (e.g., dollars per GB per day), and at a certain level of security, e.g., encryption of data at rest, secure erasure ("secure wipe"), secure network transfer, and so forth. Cloud storage providers 170 may support multiple tiers of service. Cloud manager 150 may obtain any and all such storage performance data 172 and store it locally in a database. Cloud manager 150 may also refresh such data periodically, e.g., by contacting the cloud storage providers 170 on a regular basis and updating the database with any new information. To obtain access to the cloud storage providers 170, the data storage system 116 (or an operator thereof) may have already-established customer relationships with the cloud storage providers 170. For example, the operator may have an account with each provider and the cloud manager 150 may access the respective provider using associated credentials (e.g., username and password).

In an example, cloud manager 150 supports access by administrator machine 102, e.g., via a graphical user interface (GUI), which enables administrator 104 to specify requirements 106 for snapshots of a particular data object, such as data object 132. Such requirements 106 may include, for example, a frequency of snapshots of the data object, a desired reliability for archiving those snapshots, a retention period for preserving the snapshots, and a level of security needed, including any particular security features required. As used herein, the terms "archiving" and "backing up" are used synonymously.

Having received the storage performance data 172 and the snapshot requirements 106, cloud manager 150 may perform a selection operation to designate one of the cloud storage providers 170s as a target for receiving backups of snapshots of the data object 132. In some examples, cloud manager 150 performs the selection operation periodically, e.g., on a regular basis. In other examples, cloud manager 150 performs the selection operation when an occasion arises for backing up a snapshot 134, such as when a snapshot backup is performed. Either way, cloud manager 150 may select different cloud storage providers 170 at different times, given that the cloud-storage provider that is best suited to the snapshot requirements 106 may change. The fact that each cloud storage provider 170 is seen to store one or more respective snapshots (collectively, S1-S6) shows that each cloud storage provider 170 was selected at one time as the target for storing snapshots. It can thus be seen that cloud manager 150 performs a matching function, selecting cloud storage providers 170 by matching snapshot requirements 106 with storage performance data 172.

In some examples, cloud manager 150 provides backups of snapshots as full backups. For instance, if data object 132 is 10 GB in size, then each snapshot backup of data object 132 is also 10 GB in size (ignoring small changes). In other examples, cloud manager 150 supports incremental backups of snapshots. For example, cloud manager 150 may compute a difference between a current backup and a previous backup and transmit only the difference to the cloud.

This feature may become complex when one cloud storage provider stores a full backup of an object and another cloud storage provider stores an incremental backup of the same object. In such cases, restoring the incremental backup may require accessing backups from different providers. To avoid this complexity, some embodiments aim either to keep full backups together with incremental backups or to provide full backups only. When selecting a designated cloud storage provider for an incremental backup, the cloud manager 150 may compare the cost of storing the incremental backup with its full backup to the cost of storing a new full backup on a different provider. Depending on the size of the incremental backup, it may easily be the best choice to store the full backup and its incremental backups together, even if the cost per GB is greater.

Figure 2:
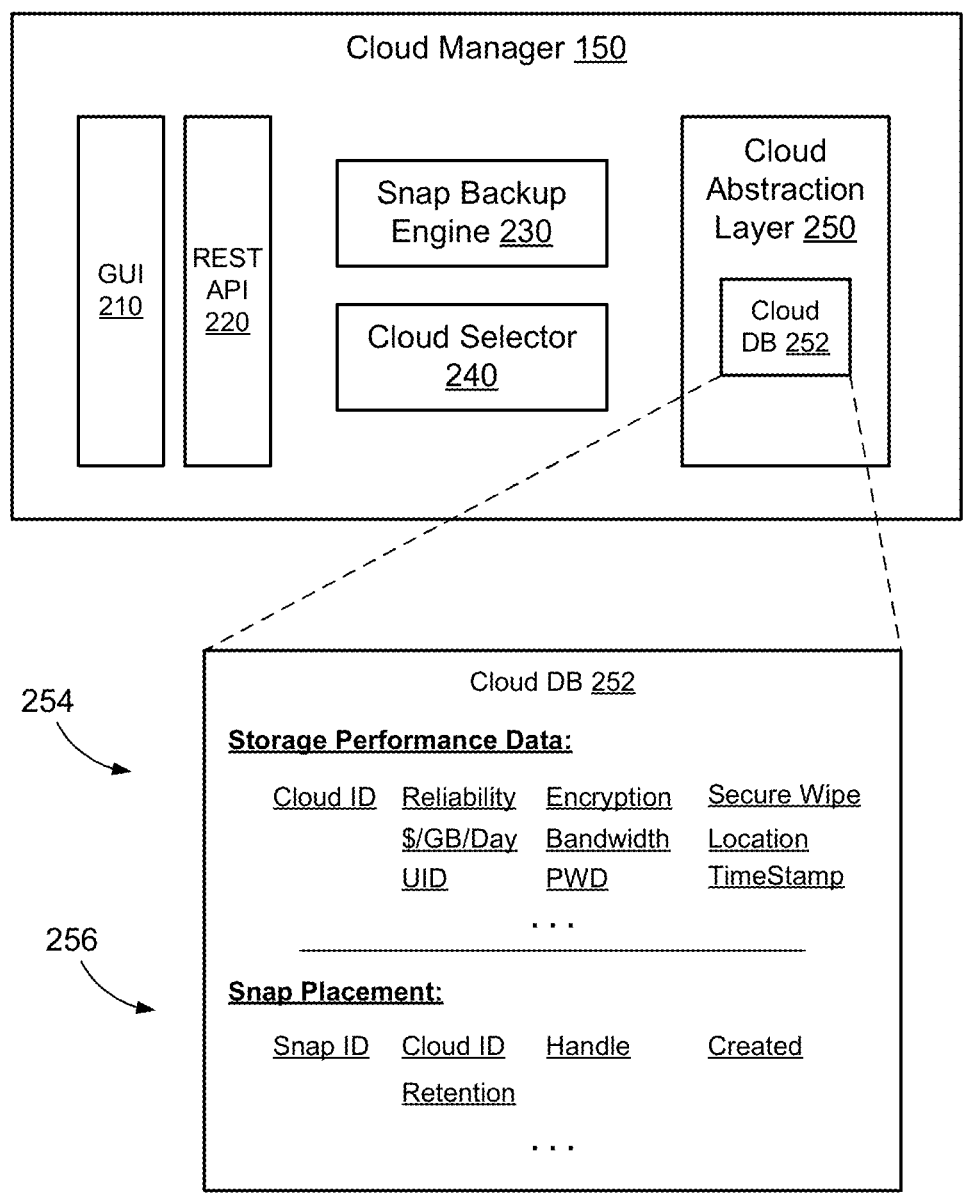
FIG. 2 is a block diagram of an example cloud manager of FIG. 1.

FIG. 2 shows example aspects of the cloud manager 150 in additional detail. Here, cloud manager 150 includes a GUI (Graphical User Interface) 210, a REST (Representational State Transfer) API (Application Program Interface) 220, a snap backup engine 230, a cloud selector 240, and a cloud abstraction later 250. The GUI 210 is configured to support control of the snap backup engine 230 by the administer machine 104 via the REST API 220. The snap backup engine 230 is configured to orchestrate snap backup activities, which may include performing snap backups to a designated cloud storage provider 170s. The snap backup engine 230 need not be synchronized with the snap scheduler 140 (FIG. 1). For example, the snap backup engine 230 and snap scheduler 140 may operate on different schedules.

Cloud selector 240 is configured to select the designated cloud storage provider 170s, e.g., by matching snapshot requirements 106 with storage performance data 172. Cloud abstraction layer 250 is configured to support provider-agnostic communications with the cloud storage providers 170. For example, cloud abstraction layer 250 incorporates APIs of the various cloud storage providers 170 and includes a generalized interface to the snap backup engine 230, allowing the snap backup engine 230 to perform snapshot backups using provider-independent syntax.

The cloud abstraction layer 250 includes or otherwise has access to a cloud database 252. As shown in the expanded view at the bottom of FIG. 2, the cloud database 252 includes a first section 254 for storage performance data 172 and a second section 256 for snapshot placement. As shown by way of example, the storage performance data 172 may include the following information:

Cloud ID. A unique identifier of the provider 170, such as a name or code.
Reliability. Reliability of the storage offering by the provider, such as a number of nines.
Encryption. Whether the provider supports encryption of data at rest.
Secure Wipe. Whether the provider supports secure erasure of data.
$/GB/Day. Cost for storing data by the provider.
Bandwidth. The speed at which data can be written and/or read from the provider.
Location. The geographic location of the data. Locality of backup to data storage system 116 may be an important consideration if frequent access to backed up snapshots is expected.

The first section 254 may store an entry for each of the cloud storage providers 170. In cases where a particular cloud storage provider 170 has multiple offerings (such as multiple tiers of service), a separate database entry may be provided for each offering. In addition, the cloud database 252 may retain a historical record of storage performance data 172 over time, so as to support time series analysis and other techniques for predicting the most suitable cloud storage offerings for respective sets of requirements.

Section 256 of the cloud database 252 may store information on a per-snapshot basis, to enable access to snapshot backups once they are placed in the cloud, e.g., for reference and/or recovery purposes. By way of example, the snap placement data may include the following:

Snap ID. A unique identifier of the snapshot 134.
Cloud ID. A unique identifier of the cloud storage provider 170 on which the snapshot backup is placed.
Handle. A URI (Uniform Resource Identifier) or other link that provides access to the snapshot at the backup location.
Created. A date or timestamp indicating a time the snapshot was generated.
Retention. Duration of time for which the respective snapshot should be retained, i.e., a time until the snapshot expires. Snapshots may be deleted by the cloud storage provider 170 once they have expired.

The second section 256 may store an entry for each snapshot 134 that is backed up to a cloud storage provider 170. Although the sections 254 and 256 are shown as residing within a single database 252, they may alternatively be placed in separate databases 252, or in any number of databases, the particular construction of which is not critical.

Figure 3:
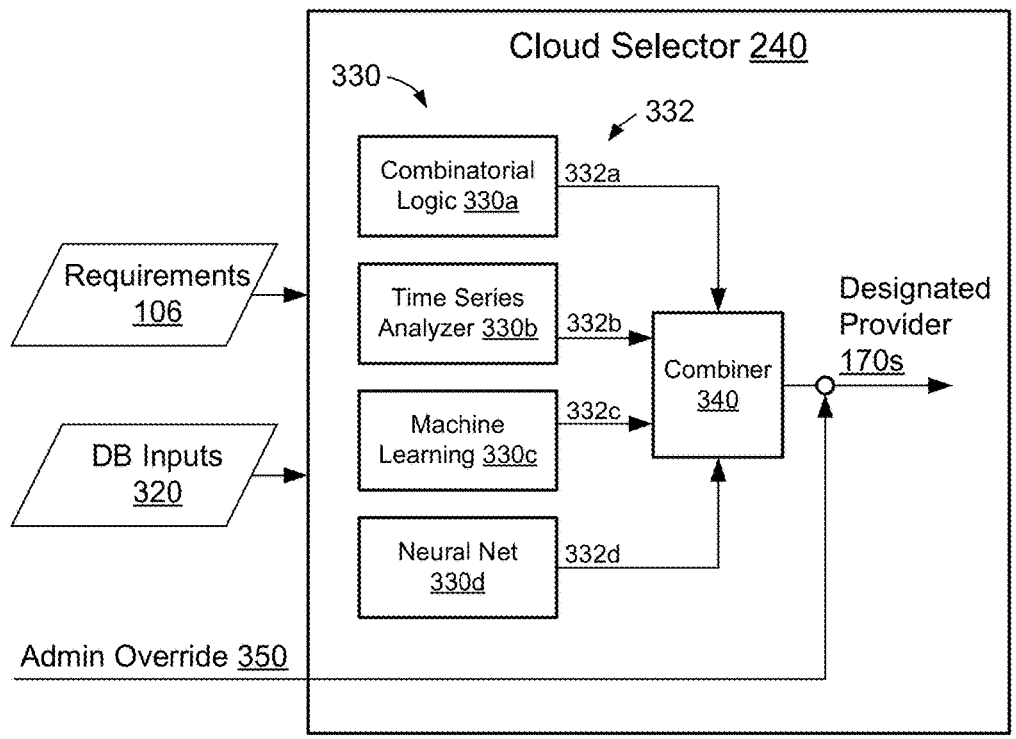
FIG. 3 is a block diagram of an example cloud selector of FIG. 1.

FIG. 3 shows example aspects of the cloud selector 240 in additional detail. As shown, cloud selector 240 receives requirements 106, e.g., backup storage requirements for snapshots of a particular data object 132 as entered into GUI 210 by administrator machine 102. Cloud selector 240 also receives database inputs 320 for storage performance data 172, e.g., as obtained by the cloud abstraction layer 250 from cloud storage providers 170 and stored in the first section 254 of the cloud database 252.

In the example shown, cloud selector 240 includes multiple analysis engines 330, such as combinatorial logic 330a, time series analyzer 330b, machine learning 330c, and neural net 330d, for example. Cloud selector 240 may employ analysis engines 330 individually or in any combination. In one example, each of the analysis engines 330 generates a respective recommendation 332 of a designated cloud storage provider 170s for addressing the received requirements 106. Combinatorial logic 330a may generate a recommendation 332a based on IF-THEN, AND, OR, and NOT operations. Time series analyzer 330b may generate a recommendation 332b based on trends in storage performance data 172 acquired over time. Machine learning 330c and neural net 330d may apply historical storage performance data 172 as training sets for configuring internal nodes and weights, and may generate respective recommendations 332c and 332d by applying backup requirements 106 as inputs to the internal nodes and weights. The particular analysis engines 330 as shown in FIG. 3 are intended to be illustrative rather than limiting. Other types of analysis engines may be used.

Combiner 340 receives recommendations 332 from analysis engines 330 (or any number of them) and generates therefrom a selection of a designated cloud storage provider 170s. For example, combiner 340 may itself employ combinatorial logic, a weighted sum, machine learning, or some other methodology for assigning the designated storage provider 170s based on output from the analysis engines 330.

In some examples, cloud selector 240 also receives an administrator override 350, which provides a direction to select a particular cloud storage provider 170 as a designee for receiving snapshot backups. Administrator 104 may have particular knowledge of an optimal cloud storage provider that the automated analysis engines 330 fail to recognize. The administrator 104 may thus manually override the automated analysis engines 330 to select a designated provider 170s directly.

Figure 4:
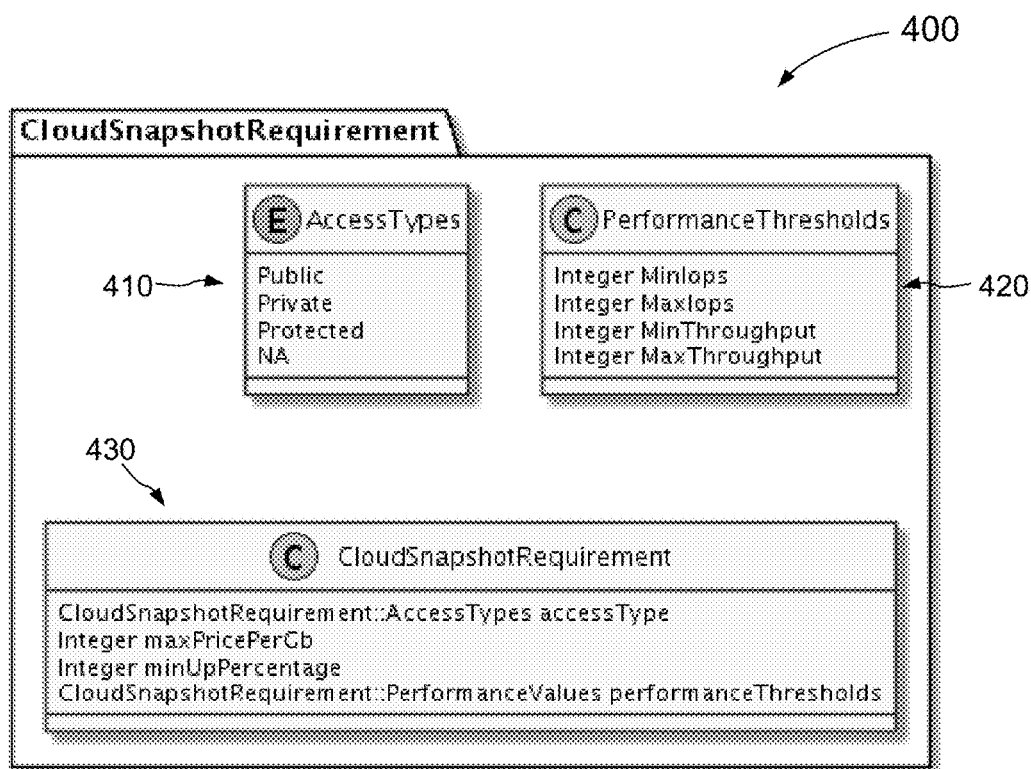
FIG. 4 is an entity-relationship diagram of an example data structure configured to store snapshot-related requirements.

FIG. 4 shows an example data structure 400 that may be used in connection with certain embodiments. Here, data structure 400 is configured to store requirements 106, e.g., requirements for snapshot backups as received via the GUI 210 from administrator machine 102. As shown, data structure 400 stores an enumeration 410 of access types, such as public cloud, private cloud, or protected cloud. Data structure 400 also stores performance thresholds 420, such as minimum and maximum IOPS (I/O requests per second) and maximum and minimum throughput. Data structure 400 further stores cloud snapshot requirement 430, which specifies, for a particular data object 132, a requested access type (from list 410) and a maximum price per gigabyte, as well as other characteristics, such as those listed in the first section 254 of cloud database 252. One should appreciate that the data structure 400 may be a memory-resident structure (e.g., a C++ or Java data object), and it may further be persisted in the cloud database 252.

Figure 5:
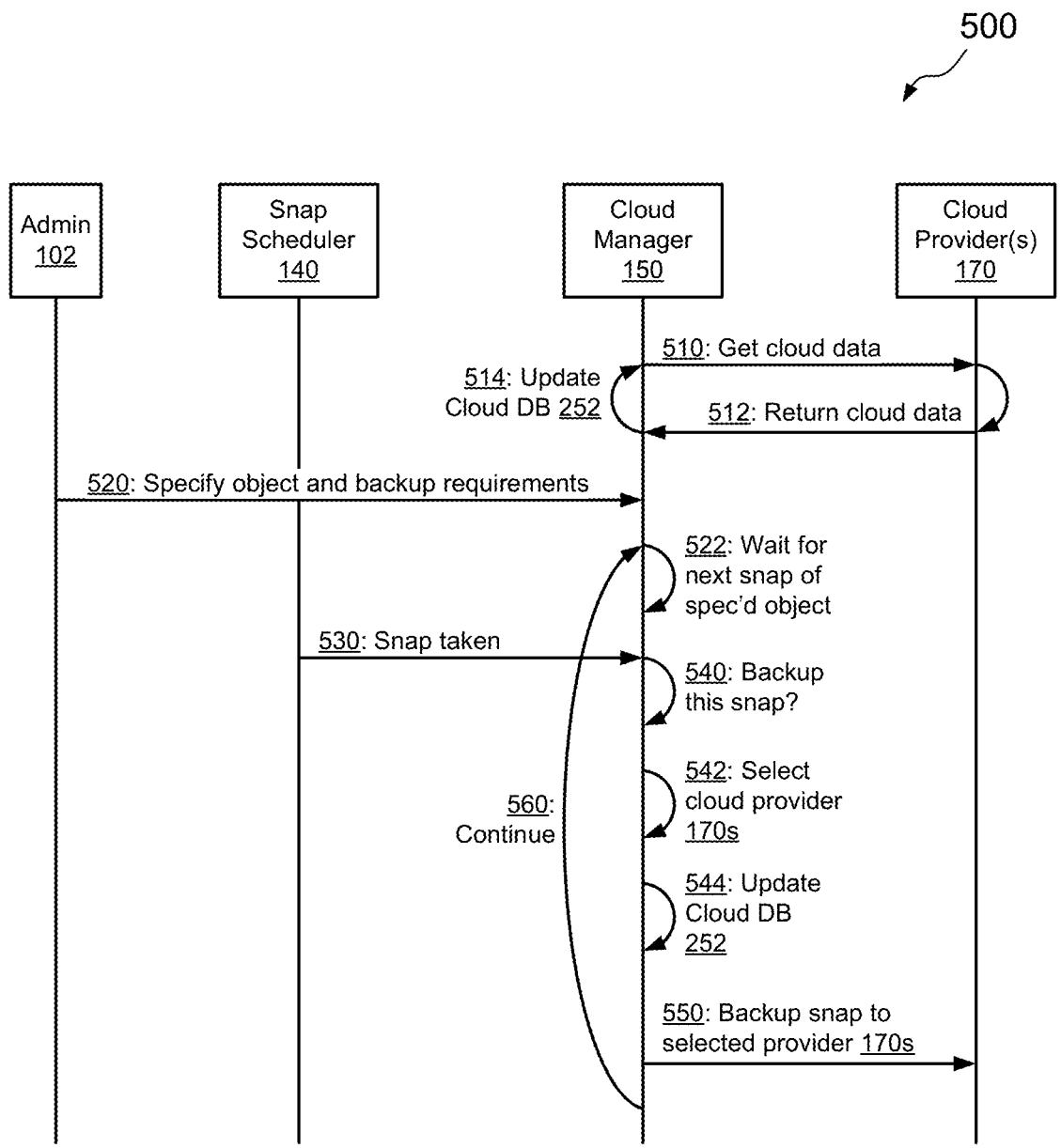
FIG. 5 is a sequence diagram that shows an example method of backing up snapshots.

FIG. 5 shows an example sequence 500 of activities for performing snapshot backup in a multi-cloud environment, such as that shown in FIG. 1. The depicted activities involve the administrator machine 102, snap scheduler 140, cloud manager 150, and cloud providers 170 (e.g., 170a-170n). Although certain acts are shown as being performed in a certain order, the order shown is merely illustrative and should not be construed as limiting.

At 510, cloud manager 150, running on SP 120, contacts one or more cloud storage providers 170 to retrieve relevant data for supporting snapshot backups. For example, cloud manager 150 acts through the cloud abstraction layer 250 and iterates over the set of cloud providers listed in the first section 254 of the cloud database 252. For each listed cloud storage provider 170 (or some subset thereof), the cloud abstraction layer 250 contacts the provider, logs on if necessary, and obtains the respective storage performance data 172, which the cloud provider 170 returns to the cloud manager 150 at 512. At 514, the cloud abstraction layer 250 updates the cloud database 252 to include the newly-obtained data. These acts 510, 512, and 514 may be repeated as needed, such as periodically, e.g., once per week, once per day, etc., and may be performed asynchronously with the other acts described herein in connection with FIG. 5.

At 520, administrative machine 102 specifies snapshot backup requirements 106 for a particular data object 132, e.g., by the administrator 104 operating the GUI 210. Cloud manager 150 receives the requirements 106 and stores them in data structure 400. At 522, the cloud manager 150 waits for the SP 120 to take a new snapshot 134 of the specified data object 132.

At 530, the snap scheduler 140 directs SP 120 to generate a new snapshot 134 of the data object 132. At 540, cloud manager 150 determines whether the newly-generated snapshot 134 is to be backed up. For example, requirements 106 may specify that fewer than all snapshots require backup. If the new snapshot is not eligible for backup, operation may return to 522, whereupon the cloud manager 150 waits to be notified that another snapshot has been taken.

Once the cloud manager 140 determines that a new snapshot 134 has been taken and is awaiting backup, then at 542 the cloud selector 240 operates to select a designated cloud storage provider 170s. In some examples, the cloud selector 240 (FIG. 3) makes a new selection in response to a new snapshot being provided for backup. In other examples, the cloud selector 240 makes a selection the first time a snapshot 134 of the data object 132 is provided for backup, and then again upon successive snapshot backups whenever the storage performance data 172 or requirements 106 have changed.

At 544, the cloud manager 150 updates the second section 256 of the cloud database 252 to record the placement of the new snapshot in the cloud, and at 550 the new snapshot is backed up to the selected cloud storage provider 170s.

Figure 6:
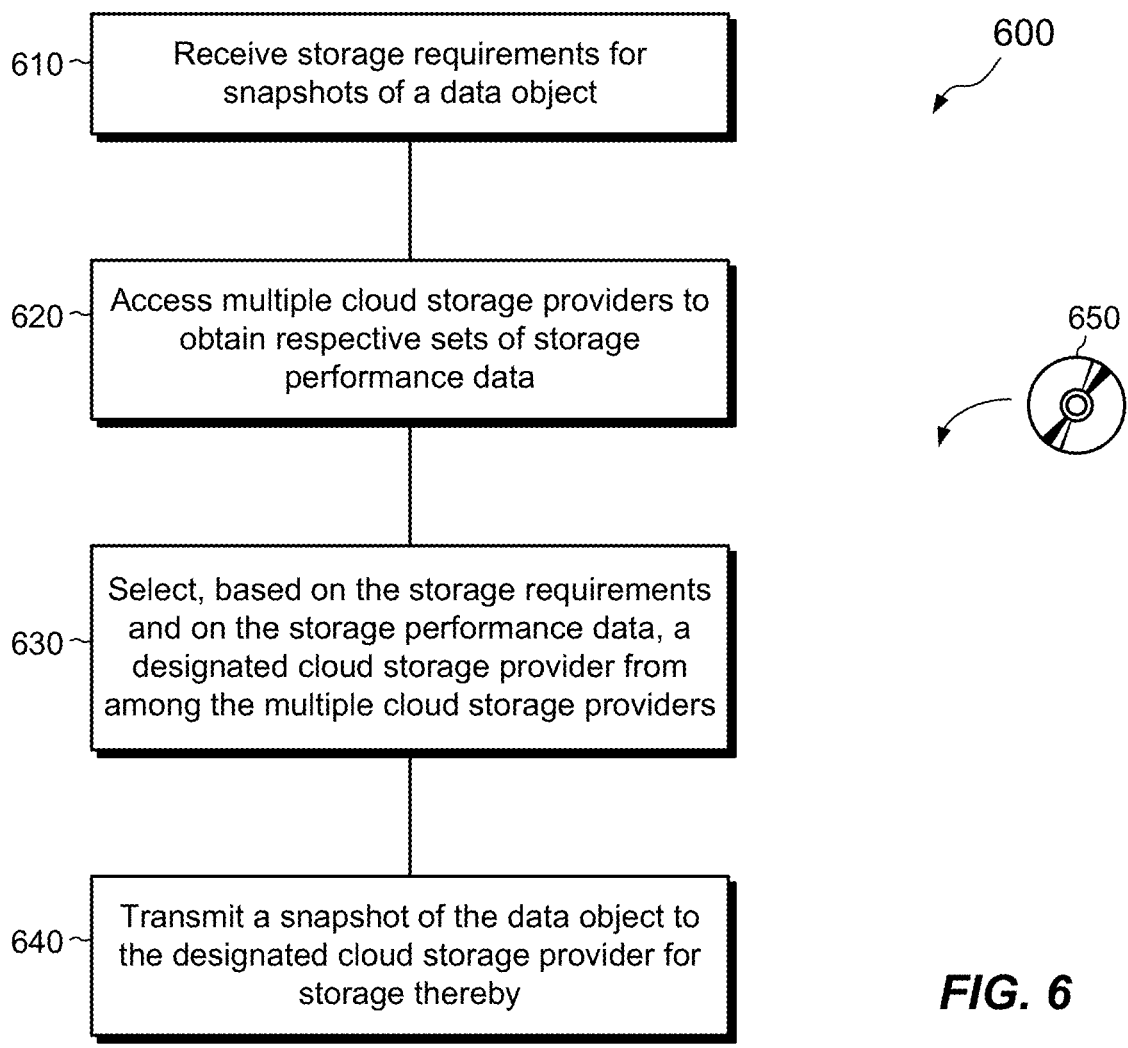
FIG. 6 is a flowchart that shows an example method of backing up snapshots in a multi-cloud environment.

FIG. 6 shows an example method 600 that may be carried out in connection with the environment 100. The method 600 is typically performed, for example, by the software constructs described in connection with FIG. 1, which reside in the memory 130 of the storage processor 120 and are run by the set of processing units 124. The various acts of method 600 may be ordered in any suitable way. Accordingly, embodiments may be constructed in which acts are performed in orders different from that illustrated, which may include performing some acts simultaneously.

At 610, storage requirements for snapshots of a data object are received. For example, cloud manager 150 may receive storage requirements 106 from an administrator machine 104 over GUI 210 and REST API 220. Alternatively, storage requirements 106 may be received from other entities and need not involve a human administrator. Cloud manager 150 may store the received requirements in data structure 400, At 620, multiple cloud storage providers are accessed to obtain respective sets of storage performance data. For example, cloud abstraction layer 250 (FIG. 2) contacts cloud storage providers 170 and obtains respective performance data 172, which may be stored in cloud database 252.

At 630, a designated cloud storage provider is selected from among multiple cloud storage providers based on the storage requirements and the storage performance data. For example, cloud selector 240 selects a designated cloud storage provider 170s from among cloud storage providers 170a-170n, based on storage requirements 106 stored in data structure 400 and storage performance data 172 stored in the cloud database 252.

At 640, a snapshot of the data object is transmitted to the designated cloud storage provider for storage thereby. For example, cloud abstraction layer 250 establishes a connection with the designated cloud storage provider 170s and transmits a snapshot 134 of data object 132 to that provider 170s for backup storage.

An improved technique has been described for backing up snapshots 134 in a multi-cloud environment 100. The technique includes accessing multiple cloud storage providers 170 and obtaining therefrom respective sets 172 of storage performance data. The technique further includes receiving storage requirements 106 for snapshots 134 of a data object 132 and selecting, based on the requirements 106 and the storage performance data 172, a designated cloud storage provider 170s for receiving archived snapshots 134 of the data object 132. The technique then transmits one or more snapshots 134 of the data object 132 to the designated cloud storage provider 170s for archiving.

Having described certain embodiments, numerous alternative embodiments or variations can be made. For example, although embodiments have been described in which SP 120 manages cloud-based backup of snapshots, this is merely an example and should not be construed as limiting. For instance, similar functionality may be provided by some other processing node or computer, such as the administrator machine 102.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 650 in FIG. 6). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should not be interpreted as meaning "based exclusively on" but rather "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of backing up snapshots in a multi-cloud environment, the method comprising:
   receiving storage requirements for snapshots of a data object;
   accessing multiple cloud storage providers to obtain respective sets of storage performance data;
   selecting, based on the storage requirements and on the respective sets of storage performance data, a designated cloud storage provider from among the multiple cloud storage providers; and
   transmitting a snapshot of the data object to the designated cloud storage provider for storage thereby.

2. The method of claim 1, wherein receiving the storage requirements includes accepting administrator input by a graphical user interface (GUI) and storing the administrator input in a data structure.

3. The method of claim 2, further comprising:
   generating snapshots of the data object in accordance with a snapshot schedule for the data object; and
   transmitting snapshots of the data object to the designated cloud storage provider in accordance with a backup schedule, the backup schedule operating independently of the snapshot schedule.

4. The method of claim 3, wherein the backup schedule performs backups of the data object less frequently than the snapshot schedule generates snapshots of the data object.

5. The method of claim 1, wherein the transmitted snapshot is a particular snapshot, and wherein selecting the designated cloud storage provider is performed in response to generating the particular snapshot of the data object.

6. The method of claim 1, wherein accessing the cloud storage providers to obtain the respective sets of storage performance data is repeated on a periodic basis, and wherein selecting the designated cloud storage provider includes selecting different cloud storage providers at different times for backing up respective snapshots of the data object.

7. The method of claim 1, wherein accessing the cloud storage providers to obtain the respective sets of storage performance data includes obtaining any of data security, cost, and reliability information.

8. The method of claim 7, further comprising obtaining the respective sets of storage performance data repeatedly over time, wherein selecting the designated cloud storage provider includes performing a time series analysis on the respective sets of storage performance data, the designated cloud storage provider being selected based at least in part on the time series analysis.

9. The method of claim 1, wherein selecting the designated cloud storage provider includes comparing performance characteristics of an incremental backup to a currently designated cloud storage provider with performance characteristics of a full backup to another cloud storage provider.

10. The method of claim 1, wherein the transmitted snapshot is a particular snapshot, and wherein transmitting the particular snapshot of the data object to the designated cloud storage provider includes specifying a retention interval for the particular snapshot, the particular snapshot configured to expire automatically upon expiration of the retention interval.

11. The method of claim 1, wherein the storage requirements for snapshots of the data object include a frequency of snapshots of the data object, a desired reliability for archiving those snapshots, and a retention period for preserving the snapshots.

12. The method of claim 11, further comprising:
generating a set of snapshots of the data object in accordance with a snapshot schedule for the data object; and
temporarily storing the set of snapshots locally until a subsequent backup to the designated cloud storage provider in accordance with a backup schedule for snapshots, the backup schedule operating independently of the snapshot schedule and at a lower frequency than the snapshot schedule.

13. A computerized apparatus, comprising control circuitry that includes a set of processing units coupled to memory, the control circuitry constructed and arranged to:
receive storage requirements for snapshots of a data object;
access multiple cloud storage providers to obtain respective sets of storage performance data;
select, based on the storage requirements and on the respective sets of storage performance data, a designated cloud storage provider from among the multiple cloud storage providers; and
transmit a snapshot of the data object to the designated cloud storage provider for storage thereby.

14. A computer program product including a set of non-transitory, computer-readable media having instructions which, when executed by control circuitry of a computerized apparatus, cause the computerized apparatus to perform a method of backing up snapshots in a multi-cloud environment, the method comprising:
receiving storage requirements for snapshots of a data object;
accessing multiple cloud storage providers to obtain respective sets of storage performance data;
selecting, based on the storage requirements and on the respective sets of storage performance data, a designated cloud storage provider from among the multiple cloud storage providers; and
transmitting a snapshot of the data object to the designated cloud storage provider for storage thereby.

15. The computer program product of claim 14, wherein receiving the storage requirements includes accepting administrator input by a graphical user interface (GUI) and storing the administrator input in a data structure.

16. The computer program product of claim 15, wherein the method further comprises:
generating snapshots of the data object in accordance with a snapshot schedule for the data object; and
transmitting snapshots of the data object to the designated cloud storage provider in accordance with a backup schedule, the backup schedule operating independently of the snapshot schedule.

17. The computer program product of claim 16, wherein the backup schedule performs backups of the data object less frequently than the snapshot schedule generates snapshots of the data object.

18. The computer program product of claim 14, wherein the transmitted snapshot is a particular snapshot, and wherein selecting the designated cloud storage provider is performed in response to generating the particular snapshot of the data object.

19. The computer program product of claim 14, wherein accessing the cloud storage providers to obtain the respective sets of storage performance data is repeated on a periodic basis, and wherein selecting the designated cloud storage provider includes selecting different cloud storage providers at different times for backing up respective snapshots of the data object.

20. The computer program product of claim 14, wherein accessing the cloud storage providers to obtain the respective sets of storage performance data includes obtaining any of data security, cost, and reliability.

21. The computer program product of claim 20, wherein the method further comprises obtaining the respective sets of storage performance data repeatedly over time, wherein selecting the designated cloud storage provider includes performing a time series analysis on the respective sets of storage performance data, the designated cloud storage provider being selected based at least in part on the time series analysis.

22. The computer program product of claim 14, wherein selecting the designated cloud storage provider includes comparing performance characteristics of an incremental backup to a currently designated cloud storage provider with performance characteristics of a full backup to another cloud storage provider.

* * * * *